R. C. LIVESAY & G. E. ALEXANDER.
SHAFT BEARING.
APPLICATION FILED JUNE 21, 1913.
1,179,638.  Patented Apr. 18, 1916.
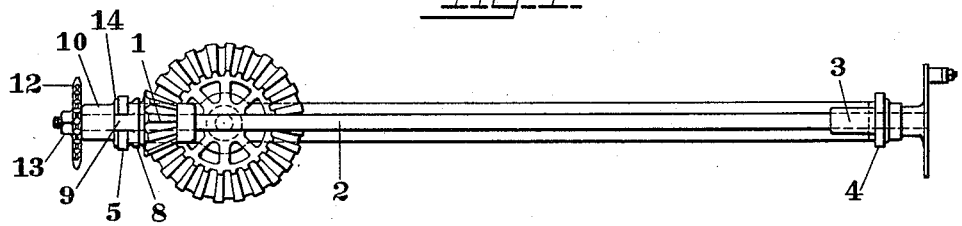
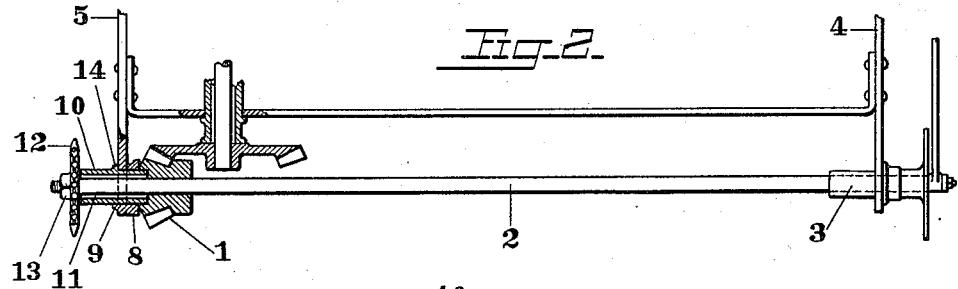
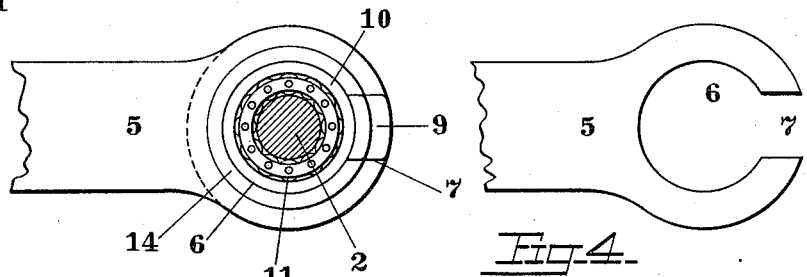
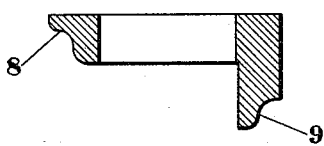
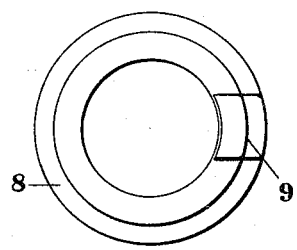
Witnesses:
Martin Peterson
W. F. Duffield
Inventors:
Robert C. Livesay
George E. Alexander
by W. C. Jrdinston
Attorney

UNITED STATES PATENT OFFICE.

ROBERT C. LIVESAY, OF MOLINE, AND GEORGE E. ALEXANDER, OF EAST MOLINE, ILLINOIS, ASSIGNORS TO DEERE & COMPANY, OF MOLINE, ILLINOIS, A CORPORATION OF ILLINOIS.

SHAFT-BEARING.

1,179,638.

Specification of Letters Patent. Patented Apr. 18, 1916.

Application filed June 21, 1913. Serial No. 775,104.

*To all whom it may concern:*

Be it known that we, ROBERT C. LIVESAY and GEORGE E. ALEXANDER, citizens of the United States, residing at Moline and East Moline, respectively, in the county of Rock Island and State of Illinois, have invented certain new and useful Improvements in Shaft-Bearings, of which the following is a specification, reference being had therein to the accompanying drawing.

Our invention relates to shaft bearings particularly as applied to harvesters or similar machinery.

To provide an efficient means of quickly mounting or dismounting shafting is the principal object of our invention.

Referring to the drawings in which similar numerals indicate identical parts—Figure 1 is an end elevation of a grain harvester and binder main frame showing the main shaft and bearings. Fig. 2 is a plan of the same in part section, and Figs. 3, 4, 5 and 6 are enlarged details.

Ordinarily in mechanisms of this description the bevel pinion 1 rigidly mounted on the main shaft 2 is the part most liable to damage, and it is generally important that repairs be made as soon as possible or a new pinion supplied; with that end in view, and without impairing the strength or efficiency of the assembled parts, we mount the forward end of the shaft 2 in a rockable sleeve 3 in a bearing on the bar 4 which forms part of the front frame of the machine, so that if the rear-end of the shaft 2 is released it can be moved outward from the frame when desired. The bar 5, forming part of the rear of the machine frame, has a bearing 6 in the end thereof having a portion cut away providing an opening 7 substantially of a length similar to the diameter of the shaft 2. A collar 8, between the pinion 1 and the bar 5, has a projection 9 adapted to close the opening 7; a sleeve 10 passes through the eye 6 and through the collar 8 contacting with the end of the bevel pinion 1. In the sleeve 10, we usually provide a roller bearing 11 in which the shaft revolves. To retain the shaft 2 against longitudinal movement we mount upon the rear end thereof a sprocket 12 which revolves with the shaft 2 and is held thereon by a nut 13, the sprocket 12 being employed to convey power to other parts of the machine not shown; an ordinary washer may be substituted for the sprocket 12, where the latter is not of use, retaining the washer against the sleeve 10 by the nut 13. The sleeve 10 has a circumferential flange 14 intermediate its ends, which contacts with the bar 5 and is cut away to form a notch to permit the projection 9 on the collar 8 to engage therewith. The projection 9 engaging the opening 7 and the notch in the flange 14, both the collar 8 and sleeve 10 are locked to the bar 5 and their rotation is prevented.

When it is desired to remove the rear-end of the shaft 2 we take off the nut 13 and sprocket 12, the sleeve 10 can then be withdrawn from the bearing 6, the notch in the flange 14 at the same time disengaging from the projection 9 on the collar 8. A lateral movement of the shaft 2 will disengage the projection 9 on the collar 8 from the opening 7 and the shaft 2 can be passed through the opening 7 a sufficient distance to permit removal of the pinion 1 therefrom or for any other desired purpose, the front end of the shaft 2 and the sleeve thereon rocking in the bearing on the bar 4.

Our device is simple and effective, and repairs can be readily made with a minimum of time and labor.

We do not confine our device to shafting for harvesting machinery, as it can be readily utilized elsewhere, nor do we limit its use for one end of a shaft only, for it is obvious that the same device may be employed for both ends of a shaft or intermediate thereof.

What we claim is—

1. In a shaft-bearing, the combination of a supporting frame having an opening, a removable bearing sleeve in said opening, a shaft supported in said sleeve, the frame having a slot leading from the opening to permit a movement of the shaft angularly to its length when the sleeve is removed, and a collar on the shaft having a projection adapted to close the slot when the shaft is in place.

2. In a shaft-bearing, the combination of a supporting frame having an opening, a removable bearing sleeve in said opening, a shaft supported in said sleeve, the frame having a slot leading from the opening to permit lateral movement of the shaft when the sleeve is removed, and a collar on the shaft having a projection adapted to close the slot and to engage with the sleeve.

3. In a shaft-bearing, the combination of a supporting frame having an opening, a removable bearing sleeve in said opening, a shaft supported in said sleeve, the frame having a slot leading from the opening to permit lateral movement of the shaft when the sleeve is removed, a flange on said sleeve having a notch therein, and a collar on the shaft having a projection adapted to close said slot and to engage with the notch in the flange on the sleeve.

4. In a shaft-bearing, the combination of a supporting frame having an opening, a removable bearing sleeve in said opening, a shaft supported in said sleeve, the frame having a slot leading from the opening, a flange on said sleeve having a notch therein, a collar on the shaft having a projection adapted to close said slot and to engage with said notch, and means on the shaft to hold said sleeve and collar in position.

In testimony whereof we affix our signatures, in presence of two witnesses.

ROBERT C. LIVESAY.
GEORGE E. ALEXANDER.

Witnesses:
HARRY B. SEWALL,
JOSEPH DAIN, Jr.